United States Patent
Huang

(10) Patent No.: US 9,897,885 B2
(45) Date of Patent: Feb. 20, 2018

(54) ELECTROCHROMIC PANEL AND CONTROL DEVICE

(71) Applicant: Wistron Corporation, New Taipei (TW)

(72) Inventor: Yao-Han Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 108 days.

(21) Appl. No.: 13/893,364

(22) Filed: May 14, 2013

(65) Prior Publication Data

US 2014/0085699 A1  Mar. 27, 2014

(30) Foreign Application Priority Data

Sep. 24, 2012  (TW) .............................. 101134896 A

(51) Int. Cl.
G02F 1/153 (2006.01)
G02F 1/15 (2006.01)
G02F 1/1333 (2006.01)
G06F 3/02 (2006.01)

(52) U.S. Cl.
CPC ............ *G02F 1/15* (2013.01); *G02F 1/13338* (2013.01); *G06F 3/0219* (2013.01)

(58) Field of Classification Search
USPC ........ 359/270–273, 265–267, 290–292, 296, 359/298
See application file for complete search history.

(56) References Cited

U.S. PATENT DOCUMENTS

| | | | |
|---|---|---|---|
| 2002/0044065 A1* | 4/2002 | Quist ........................ B60R 1/12 | 340/815.4 |
| 2007/0103762 A1 | 5/2007 | Chang | |
| 2008/0249682 A1* | 10/2008 | Wisniewski et al. ........... 701/36 | |
| 2011/0304530 A1* | 12/2011 | Yeh et al. ..................... 345/156 | |
| 2012/0182141 A1* | 7/2012 | Peterson ................... B60R 1/12 | 340/435 |

FOREIGN PATENT DOCUMENTS

| | | |
|---|---|---|
| CN | 101308308 A | 11/2008 |
| TW | 200846803 | 12/2008 |

OTHER PUBLICATIONS

Office action dated Oct. 6, 2014 for the Taiwan application No. 101134896, filling date: Sep. 24, 2012, p. 1 line 10~14, p. 2 and p. 3 line 1~20.
Office action dated Sep. 29, 2015 for the China application No. 201210382356.7, p. 3 line 4~32, p. 4~6 and p. 7 line 1~13.

\* cited by examiner

*Primary Examiner* — Brandi Thomas
(74) *Attorney, Agent, or Firm* — Winston Hsu

(57) ABSTRACT

An electrochromic panel for a control device is disclosed. The electrochromic panel includes a first conduction layer for receiving a positive drive voltage, a second conduction layer for receiving a negative drive voltage, an electrolyte layer disposed on the second conduction layer, and a coloration layer having a pattern and disposed between the electrolyte layer and the first conduction layer, wherein an electron current generated by the negative drive voltage flows from the second conduction layer, the electrolyte layer, the coloration layer to the first conduction layer, such that the coloration layer performs a reduction-oxidation reaction and the pattern of the coloration layer changes from transparent to a non-transparent color.

13 Claims, 5 Drawing Sheets

ELECTROCHROMIC PANEL AND CONTROL DEVICE

BACKGROUND OF THE INVENTION

1. Field of the Invention

The present disclosure relates to an electrochromic panel and control device, and more particularly, to an electrochromic panel and control device utilizing electrochromic material to display specific patterns as a user interface or a control board.

2. Description of the Prior Art

Electronic products, such as a personal computer, a television, a music player, an air conditioner, a light source and other household appliances, are commonly used in the daily life, and normally equipped with a specific switch, a control board or a user interface to control its function.

Except for functions of the electronic products, its appearances are also considered to be suitable with interior designs. However, there are different key patterns on the control board of the electronic product to be operated by a user, which makes the appearances look complicated and may not be suitable with the interior designs. Besides, in practice, the control board is only used for a short time, for example, for watching a movie on the television or playing music on the music player, the control board is not used or seldom used after the movie or the music is played. In another case, the switch of the light source is needed only when the light source is being turned on or off.

Therefore, how to improve the appearances of the electronic products to appear simple and aesthetic and be suitable with interior designs has become one of a design consideration of the electronic products.

SUMMARY OF THE INVENTION

It is therefore an object of the present disclosure to provide an electrochromic panel and control device utilizing electrochromic material to display specific patterns as a user interface or a control board to increase a usage convenience and entertainment of an electronic product.

The present disclosure discloses an electrochromic panel for a control device, comprising a first conduction layer for receiving a positive drive voltage, a second conduction layer for receiving a negative drive voltage, an electrolyte layer disposed on the second conduction layer, and a coloration layer having a pattern and disposed between the electrolyte layer and the first conduction layer, wherein an electron current generated by the negative drive voltage flows from the second conduction layer, the electrolyte layer, the coloration layer to the first conduction layer, such that the coloration layer performs a reduction-oxidation reaction and the pattern of the coloration layer changes from transparent to a non-transparent color.

The present disclosure further discloses a control device comprising an electrochromic panel comprising a first conduction layer for receiving a positive drive voltage, a second conduction layer for receiving a negative drive voltage, an electrolyte layer disposed on the second conduction layer, and a coloration layer having a pattern and disposed between the electrolyte layer and the first conduction layer, wherein an electron current generated by the negative drive voltage flows from the second conduction layer, the electrolyte layer, the coloration layer to the first conduction layer, such that the coloration layer performs a reduction-oxidation reaction and the pattern of the coloration layer changes from transparent to a non-transparent color, and a control unit coupled to the electrochromic panel for inputting the positive drive voltage to the first conduction layer, and inputting the negative drive voltage to the second conduction layer according to an activate signal.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3C is a top view of the remote controller shown in FIG. 3A when the electrochromic panel shown in FIG. 1 is turned on.

FIG. 4B is a schematic diagram of the notebook computer shown in FIG. 4A when the electrochromic panel shown in FIG. 1 is turned on.

DETAILED DESCRIPTION

Electrochromism is a phenomenon that has optical characteristics, e.g. refractive index, incident rate and absorption rate, of some material changes when an electronic field or voltage is applied, such that the material appears reversibly and stably changed in color and transparentness. Commonly used electrochromic materials may be, for cathode coloration, Tungsten trioxide ($WO_3$), Prussian Blue and oxides of Molybdenum (Mo), Niobium (Nb) and Titanium (Ti), and for anode coloration, oxides of Nickel (Ni), Cobalt (Co), and Iridium (Ir).

Figure 1:
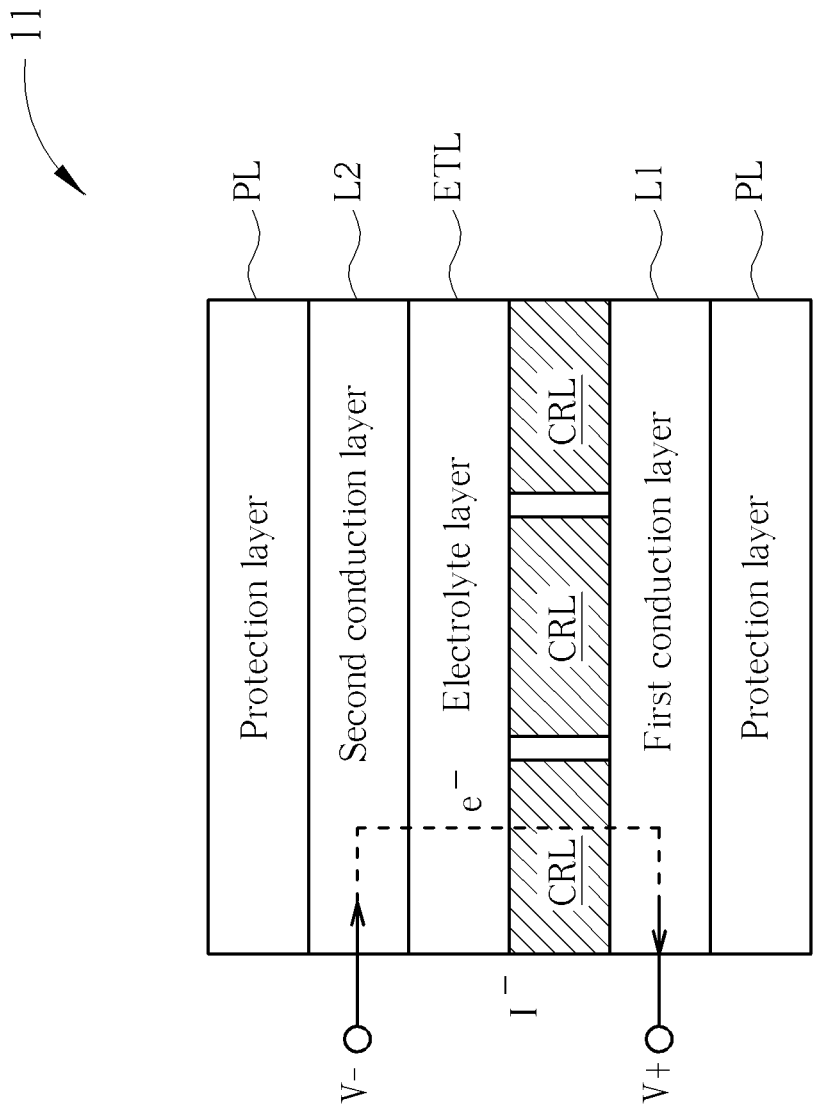
FIG. 1 is a side view of an electrochromic panel according to an embodiment of the present disclosure.

Please refer to FIG. 1, which is a side view of an electrochromic panel 11 according to an embodiment of the present disclosure. The electrochromic panel 11 includes a first conduction layer L1, a second conduction layer L2, an electrolyte layer ETL and a coloration layer CRL. The first and second conduction layer L1 and L2 are preferably made of Indium Tin Oxide (ITO) to be transparent and conductive. The first conduction layer L1 is used for receiving a positive drive voltage V+, the second conduction layer L2 is used for receiving a negative drive voltage V−. As shown in FIG. 1, the coloration layer CRL may be any electrochromic materials or polymers, which has s specific pattern formed by an etch or print process, such that the coloration layer CRL shown in FIG. 1 is partially empty. The coloration layer CRL is disposed on the first conduction layer L1, the electrolyte layer ETL is disposed between the second conduction layer L2 and the coloration layer CRL. For choosing an electrolyte, which is preferably small sized ions, e.g. Hydrogen ions ($H^+$) or Lithium ($Li^+$), to have a faster moving speed, and thus the coloration layer CRL may have a shorter reaction time. When the positive and negative drive voltages V+ and V− are respectively applied to the first and second conduction layers L1 and L2, an electron current I− flows from the second conduction layer L2, the electrolyte layer ETL, the coloration layer CRL to the first conduction layer L1, the coloration layer CRL may perform a reduction-oxidation reaction, such that the pattern of the coloration layer CRL may change from transparent to a non-transparent color. Moreover, the electrochromic panel 11 may further include protection layers PL respectively disposed on an outside of the first conduction layer L1 and an outside of the second conduction layer L2 for protecting the electrochromic panel 11, which increases a duration of the electrochromic panel 11.

For example, the following reduction-oxidation equation describes an electrochromic reaction between Tungsten trioxide and Hydrogen ions:

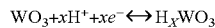

An energy bandgap of the Tungsten trioxide is within 1-3 electronic volts, the positive and negative drive voltages V+ and V− applied to the first and second conduction layers L1 and L2 may urge the Tungsten trioxide to receive electrons, e.g. combine with the Hydrogen ions, to perform a reduction reaction and generate blue Hydro-Tungstite, i.e. $H_xWO_3$. The positive and negative drive voltages V+ and V− may influence a completeness of the reduction-oxidation reaction, and thus the positive and negative drive voltages V+ and V− may be associated with a saturation of the electrochromic panel 11, which may make the electrochromic panel 11 look much more blue or much more transparent. Besides, the electrochromic panel 11 may further include a voltage stabilizer for providing the stabilized positive and negative drive voltages V+ and V−, such that the electrochromic panel 11 may appear as a uniform color, i.e. uniform blue.

Figure 2:
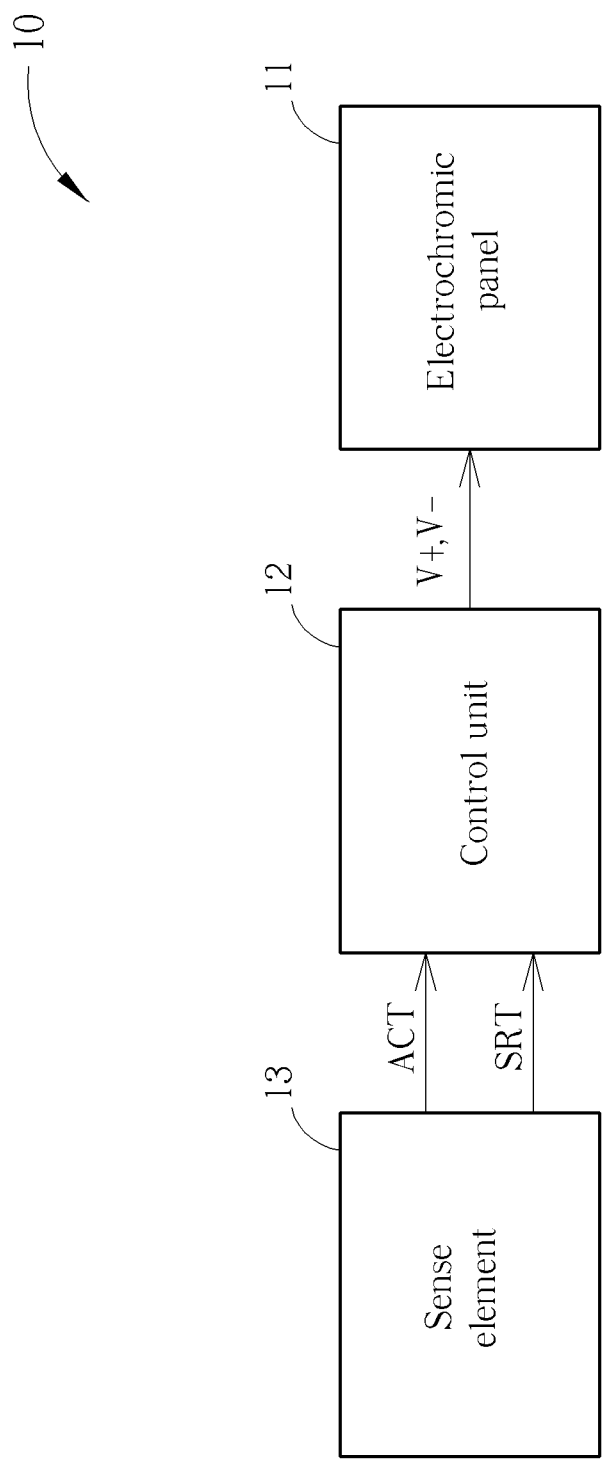
FIG. 2 is a functional block diagram of a control device according to an embodiment of the present disclosure.

Please refer to FIG. 2, which is a functional block diagram of a control device 10 according to an embodiment of the present disclosure. The control device 10 includes the electrochromic panel 11, a control unit 12 and a sense element 13. The control unit 12 is coupled to the electrochromic panel 11 and the sense element 13 for turning on or off a power of the electrochromic panel 11 according to an activate signal ACT generated by the sense element 13. When the power of the electrochromic panel 11 is turned off, the electrochromic panel 11 may appear simply transparent; while the power of the electrochromic panel 11 is turned on, the electrochromic panel 11 may change from transparent to non-transparent, and the electrochromic panel 11 may display its pattern, such as characters, numbers, operation keys and so on. Please note that "transparent" herein the present disclosure refers to "colorless" or "clear" so that the electrochromic panel 11 may appear invisible or plain when the power of the electrochromic panel 11 is turned off.

Further more, the control device 10 may utilize the sense element 13 or other sensors to detect a user touching or operating the electrochromic panel 11 and output a sense result SRT to the control unit 12, such that the control unit 12 may execute programs or control operations accordingly.

In short, the electrochromic panel 11 may be regarded as a user interface of the control device 10 for displaying patterns such as characters, numbers, operation keys and so on, the electrochromic panel 11 may cooperate with the sense element 13 or other sensors to activate the electrochromic panel 11 and detect an operation of the user to achieve the programs or the control operations accordingly.

Figure 3C:
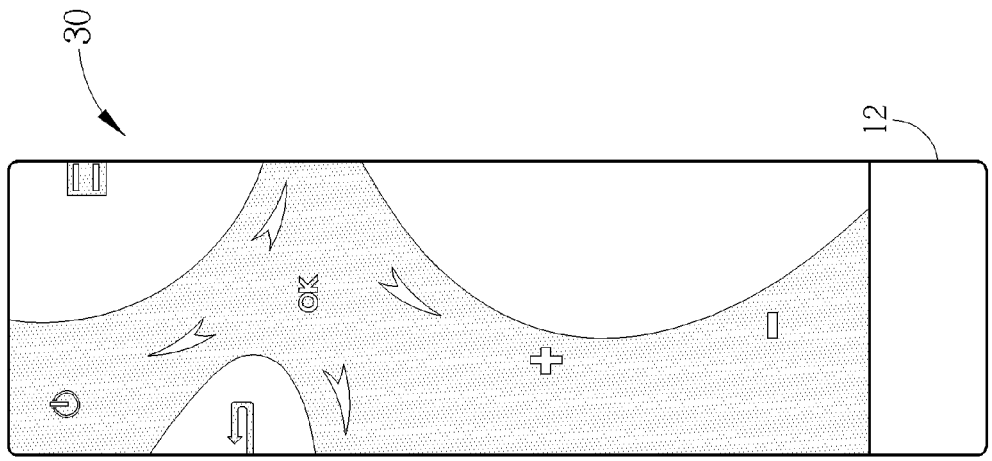
Figure 3B:
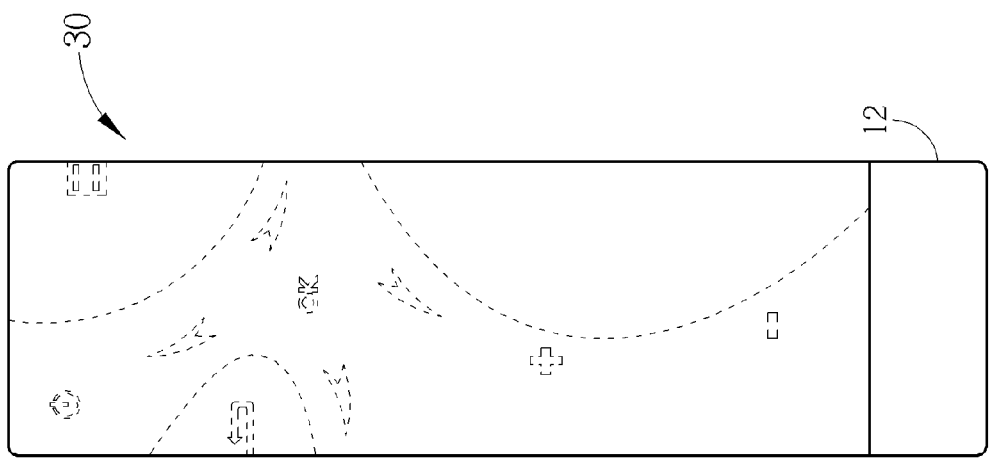
FIG. 3B is a top view of the remote controller shown in FIG. 3A when the electrochromic panel shown in FIG. 1 is turned off.
Figure 3A:
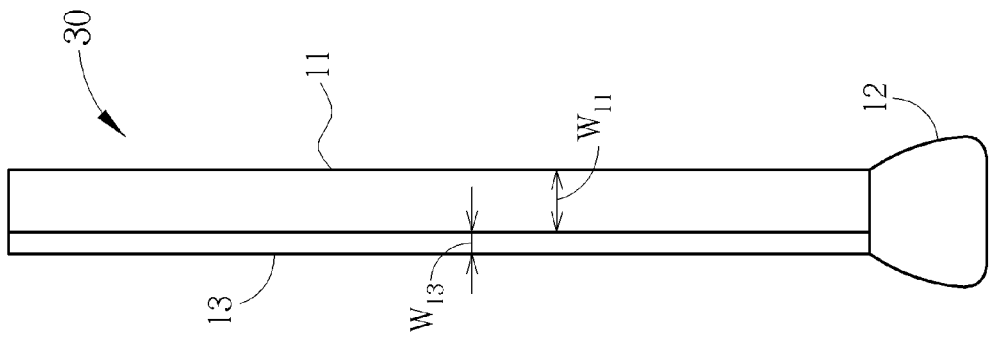
FIG. 3A is a side view of a remote controller according to an embodiment of the present disclosure.

In practice, the control device 10 may be an individual control device such as a remote controller or a switch of a light source. Specifically, please refer to FIG. 3A to FIG. 3C. FIG. 3A is a side view of a remote controller 30 according to an embodiment of the present disclosure. FIG. 3B is a top view of the remote controller 30 when the electrochromic panel 11 is turned off. FIG. 3C is a top view of the remote controller 30 when the electrochromic panel 11 is turned on. In FIG. 3A, the sense element 13 is preferably a capacitive sense element covering on the electrochromic panel 11 for sensing whether a user touches the remote controller 30 to output an activate signal ACT and the sense result SRT to the control unit 12. The control unit 12 may include sub-circuits such as a power supplier or a radio transmitter (not shown in FIG. 3A) to supply a power to the electrochromic panel 11, and transmit the sense result SRT to a multimedia player or other electronic devices by the radio transmitter. A thickness $W_{11}$ of the electrochromic panel 11 may be associated with a thickness $W_{13}$ of the sense element 13, a designer may adjust the thickness $W_{11}$ or $W_{13}$ according to practical requirements to avoid electromagnetic field generated by the power of the electrochromic panel 11 from interfering with the sense element 13. In this embodiment, for example, the thickness $W_{11}$ of the electrochromic panel 11 may be 3.0 mm, the thickness $W_{13}$ of the capacitive sense element 13 may be 0.2 mm. Also, a sensitivity of the capacitive sense element 13 may be properly adjusted to reduce wrong detections, which may optimize the operation of the remote controller 30.

As shown in FIG. 3B, when the remote controller 30 is used by the user, the electrochromic panel 11 may appear simply transparent. In FIG. 3C, when the user touches the remote controller 30, the capacitive sense element 13 may output the activate signal ACT to the control unit 12 to turn on the power of the electrochromic panel 11, so as to display its pattern, e.g. a power, a menu, a return, an OK, an up, a down, a left, a right, a plus and a minus keys shown in FIG. 3C. Noticeably, the color-changed regions indicate where the reduction reaction is performed in the coloration layer CRL, while the reduction-oxidation reaction is not performed in the color-unchanged regions. As a result, the user may touch positions corresponding to the patterns, i.e. the keys mentioned above, of the electrochromic panel 11, and the capacitive sense element 13 may detect the position to output the sense result SRT to the control unit 12, such that the control unit 12 may execute the programs or the control operations accordingly. If the user no longer uses the remote controller 30, e.g. turn off a television or the control unit 12 has not received the sense result SRT for a while, the control unit 12 may automatically turn off the power of the electrochromic panel 11, and the electrochromic panel 11 may perform an oxidation reaction to gradually change back to transparent.

The sense element 13 may be different types of sense elements such as a resistive, a light, a sonic sense element or a gyroscope. Take the resistive sense element for example, the electrochromic panel 11 may be turned on when the user holds the remote controller 30, and the resistive sense element may detect where the position is pressed to output the sense result SRT. The remote controller 30 may include two or more sense elements for respectively outputting the activate signal ACT and the sense result SRT. For example, the remote controller 30 may utilize the sonic sense element or the gyroscope to generate the activate signal ACT, for example, the user makes sounds or picks up the remote controller 30 from a table. Afterwards, the remote controller 30 may utilize the resistive, light or capacitive sense element to detect positions where the user is touched or pressed on the remote controller 30 to generate the sense result SRT accordingly.

Besides, the control device 10 may be integrated into other electronic device as the user interface of the electronic device, e.g. a keyboard of a notebook computer or a control board of a television, a music player or a multimedia player.

Figure 4A:
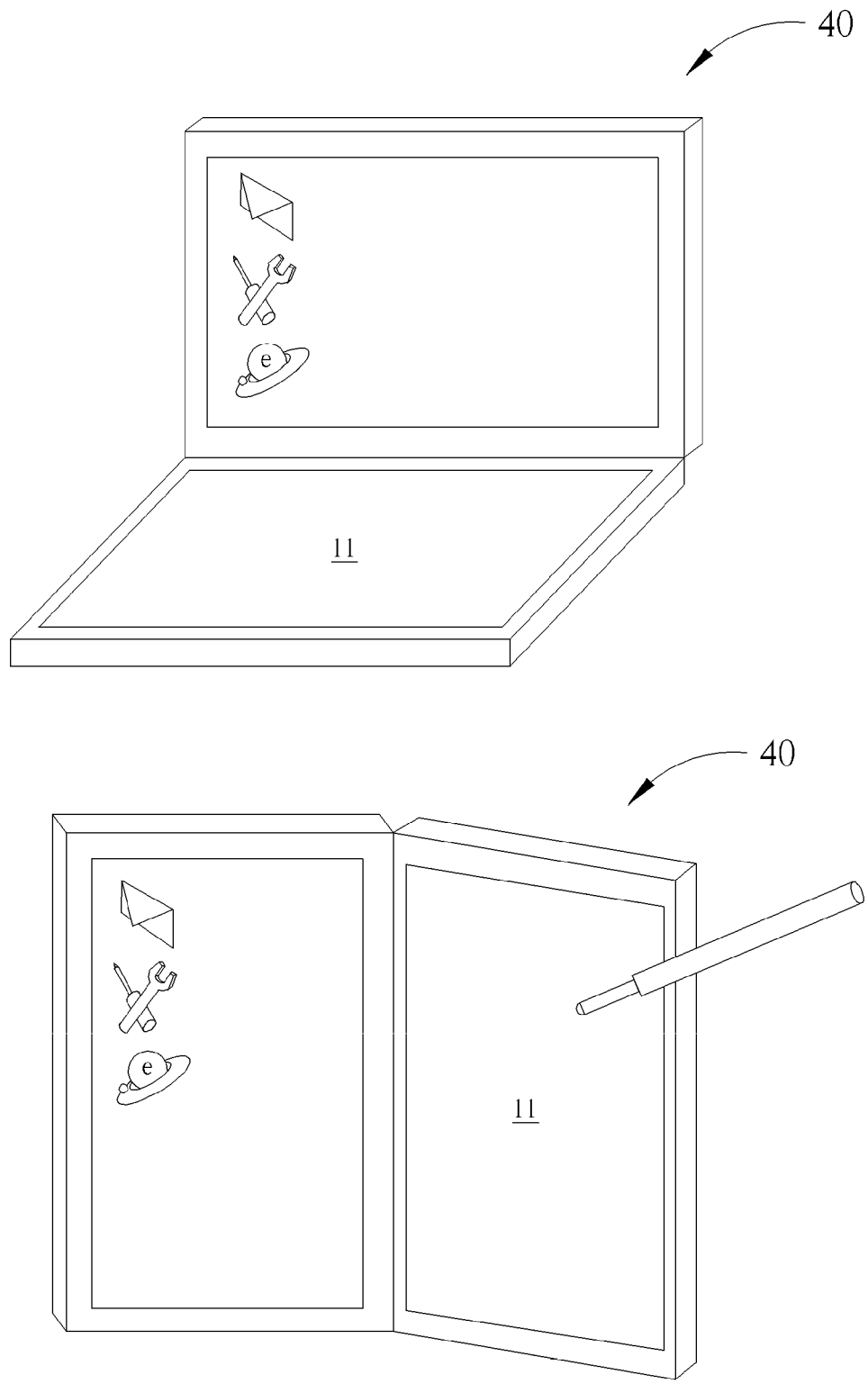
FIG. 4A is a schematic diagram of a notebook computer when the electrochromic panel shown in FIG. 1 is turned off according to an embodiment of the present disclosure.
Figure 4B:
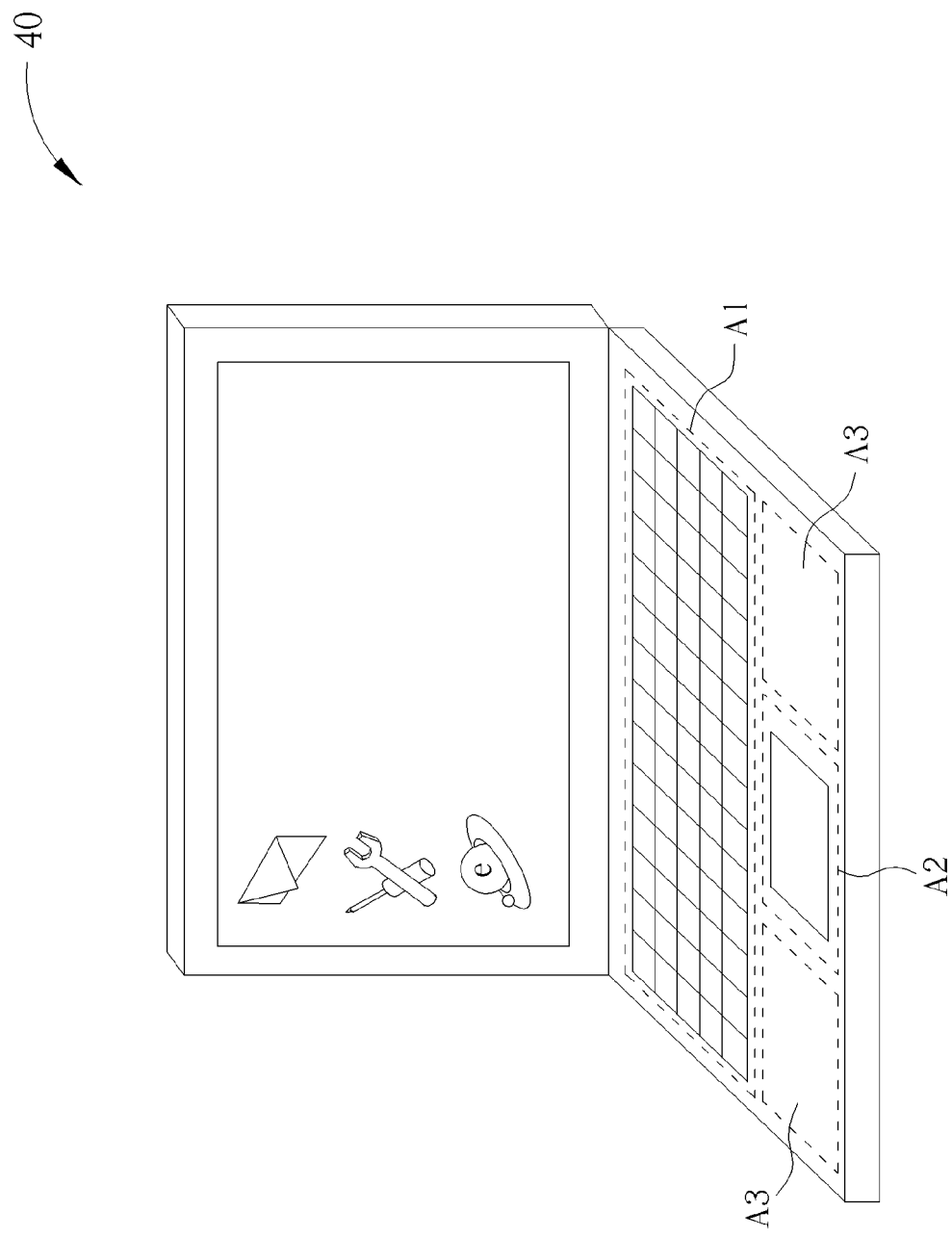

Taking a notebook computer for example, please refer to FIG. 4A and FIG. 4B. FIG. 4A is a schematic diagram of a notebook computer 40 when the electrochromic panel 11 is turned off according to an embodiment of the present disclosure. FIG. 4B is a schematic diagram of the notebook computer 40 when the electrochromic panel 11 is turned on. The electrochromic panel 11 may display a user interface, while a central processor or other computing unit (not shown in FIG. 4A) of the notebook computer 40 may take place of the control unit 12. The sense element 13 is preferably a capacitive sense element covering on the electrochromic panel 11 for sensing positions where the user touches the electrochromic panel 11 to generate the activate signal ACT and the sense result SRT. As shown in FIG. 4A, when the power of the electrochromic panel 11 is turned off, the electrochromic panel 11 appears simply transparent to be a drawing or hand writing board.

In FIG. 4B, the electrochromic panel 11 may be divided into regions A1, A2 and A3 for respectively displaying their patterns at the same time or individually. For example, the region A1 may be used for displaying a keyboard, the region A2 may be used for displaying a touchpad and the region A3 may be used for displaying play hotkeys. In such a structure, when the user touches the region A1, the sense element 13 may output an activate signal ACT1 to the control unit 12 to turn on a power of the region A1 so as to display the keyboard. When the user touches the region A2, the sense element 13 may output an activate signal ACT2 to the control unit 12 to turn on a power of the region A2 so as to display the touch pad. When the user touches the region A3, the sense element 13 may output an activate signal ACT3 to the control unit 12 to turn on a power of the region A3 so as to display the play hotkeys. Also, the regions A1, A2 and A3 may be made of different electrochromic materials and applied to corresponding drive voltages, such that the regions A1, A2 and A3 may appear different colors.

To sum up, the electrochromic panel 11 of the present disclosure may be used as the user interface of the control device 10 for displaying characters, numbers or operation keys, and the sense element 13 or other types of sensors may activate the electrochromic panel 11 and detect the operation of the user to achieve the programs or the control operations accordingly. Therefore, the control device 10 may be integrated into the remote controller 30, the notebook computer 40 or other electronic products. When not using the control device 10, the electrochromic panel 11 may appear simply transparent to hide its key patterns to suit with the interior design. When using the control device 10, the electrochromic panel 11 may change from transparent to the non-transparent color to display its key patterns, which increases a usage convenience and entertainment of the electronic product.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electrochromic panel for a control device, comprising:
    a first conduction layer for receiving a positive drive voltage;
    a second conduction layer for receiving a negative drive voltage;
    an electrolyte layer disposed on the second conduction layer; and
    a coloration layer having a pattern and disposed between the electrolyte layer and the first conduction layer, wherein an electron current generated by the negative drive voltage flows from the second conduction layer, the electrolyte layer, the coloration layer to the first conduction layer, such that the coloration layer performs a reduction-oxidation reaction and the pattern of the coloration layer changes from transparent to a non-transparent color;
    wherein the electrochromic panel is a user interface of the control device;
    wherein the control device comprises a capacitive sense element entirely covering on the electrochromic panel for sensing a position where a user touches the electrochromic panel, wherein an area of the electrochromic panel is equal to an area of the sense element, and a thickness of a protection layer of the electrochromic panel is associated with a thickness of the capacitive sense element to avoid an electromagnetic field generated by the positive and negative drive voltages from interfering with the capacitive sense element.

2. The electrochromic panel of claim 1, wherein the control device comprises a control unit coupled to the electrochromic panel for inputting the positive drive voltage to the first conduction layer, and inputting the negative drive voltage to the second conduction layer according to an activate signal.

3. The electrochromic panel of claim 2, wherein the capacitive sense element is coupled to the control unit for generating a sense result to the control unit according to the position, and the control unit executes programs or control operations according to the sense result.

4. The electrochromic panel of claim 2, wherein the control device further comprises a sense element coupled to the control unit for generating the activate signal, and the sense element is a resistive, a light, or a sonic sense element.

5. The electrochromic panel of claim 1, wherein the control device is a control interface of a computer keyboard, a remote controller, a television control board, a light switch or a music player.

6. The electrochromic panel of claim 1, wherein a saturation of the color is associated with the positive drive voltage and the negative drive voltage.

7. The electrochromic panel of claim 1, comprising at least a protection layer disposed on an outside of the first conduction layer and an outside of the second conduction layer.

8. A control device comprising:
    an electrochromic panel comprising:
        a first conduction layer for receiving a positive drive voltage;
        a second conduction layer for receiving a negative drive voltage;
        an electrolyte layer disposed on the second conduction layer; and
        a coloration layer having a pattern and disposed between the electrolyte layer and the first conduction layer, wherein an electron current generated by the negative drive voltage flows from the second conduction layer, the electrolyte layer, the coloration layer to the first conduction layer, such that the coloration layer performs a reduction-oxidation reaction and the pattern of the coloration layer changes from transparent to a non-transparent color;

a control unit coupled to the electrochromic panel for inputting the positive drive voltage to the first conduction layer, and inputting the negative drive voltage to the second conduction layer according to an activate signal; and a capacitive sense element entirely covering on the electrochromic panel for sensing a position where a user touches the electrochromic panel, wherein an area of the electrochromic panel is equal to an area of the sense element, and a thickness of a protection layer of the electrochromic panel is associated with a thickness of the capacitive sense element to avoid an electromagnetic field generated by the positive and negative drive voltages from interfering with the capacitive sense element;

wherein the electrochromic panel is a user interface of the control device.

9. The control device of claim 8, wherein the capacitive sense element is coupled to the control unit for generating a sense result to the control unit according to the position, and the control unit executes programs or control operations according to the sense result.

10. The control device of claim 8, comprising a sense element coupled to the control unit for generating the activate signal, and the sense element is a resistive, a light, or a sonic sense element.

11. The control device of claim 8, wherein the control device is a control interface of a computer keyboard, a remote controller, a television control board, a light switch or a music player.

12. The control device of claim 8, wherein a saturation of the color is associated with the positive drive voltage and the negative drive voltage.

13. The control device of claim 8, comprising at least a protection layer disposed on an outside of the first conduction layer and an outside of the second conduction layer.

* * * * *